Dec. 24, 1968     H. NÄDLER     3,418,192

TIRE BUILDING DRUM

Filed April 26, 1965     2 Sheets-Sheet 1

INVENTOR.
Heinrich NÄDLER
BY

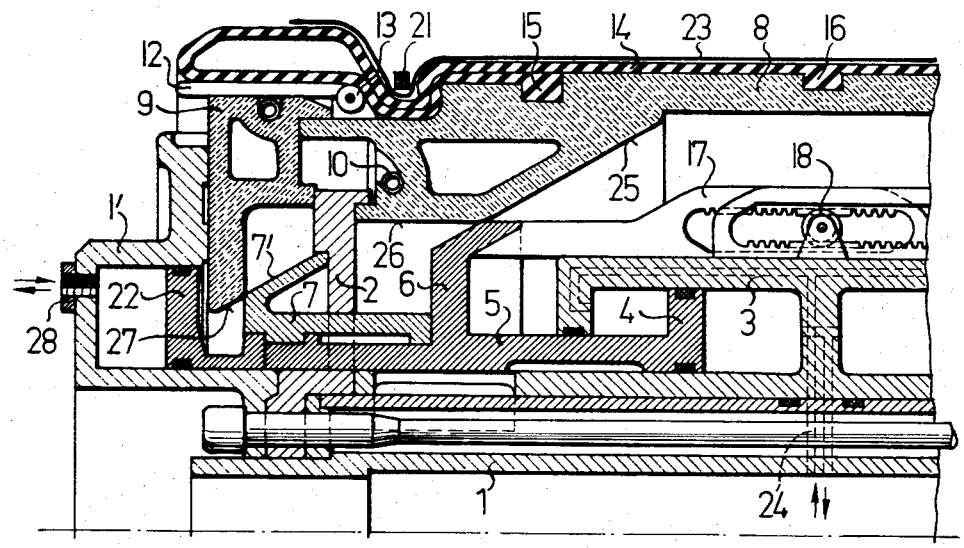
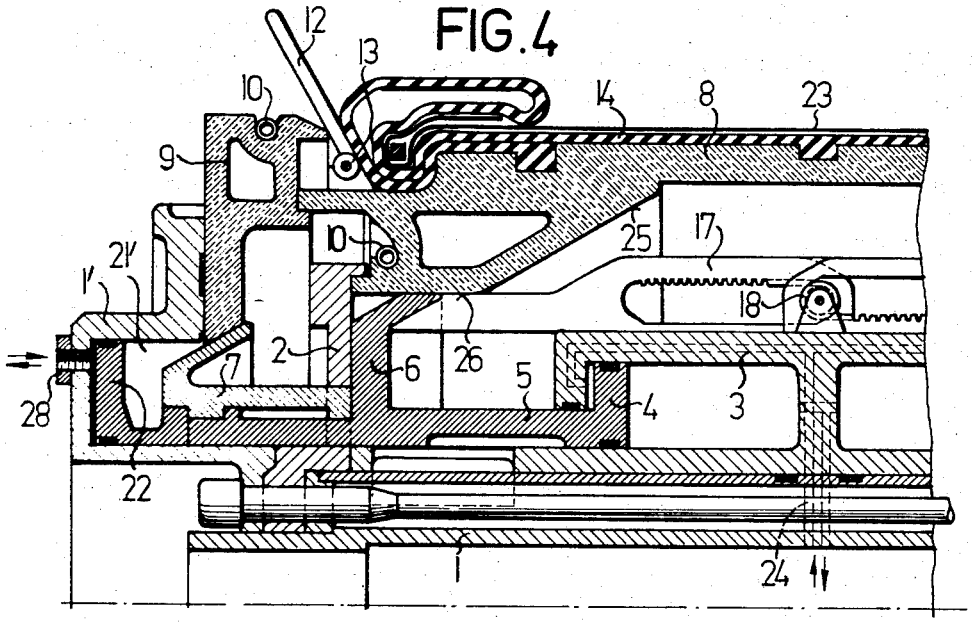

United States Patent Office 3,418,192
Patented Dec. 24, 1968

3,418,192
TIRE BUILDING DRUM
Heinrich Nädler, Hagen, Kreis Neustadt am Rubenberge, Germany, assignor to Continental Gummi-Werke Aktiengesellschaft, Hannover, Germany
Filed Apr. 26, 1965, Ser. No. 450,742
Claims priority, application Germany, Apr. 27, 1964,
C 32,739
6 Claims. (Cl. 156—401)

ABSTRACT OF THE DISCLOSURE

A segmental drum for building tire carcasses with inflatable means respectively extending around the end portions of the drum in foldable inflatable condition outwardly, which includes lever means respectively pivotally connected to the end portions of the drum adjacent said inflatable means, and actuating means arranged within the segments of said drum, and operable successively to move along inclined surfaces for adjusting said segments radially outwardly and for actuating means pivoting said lever means.

---

Figure 1:
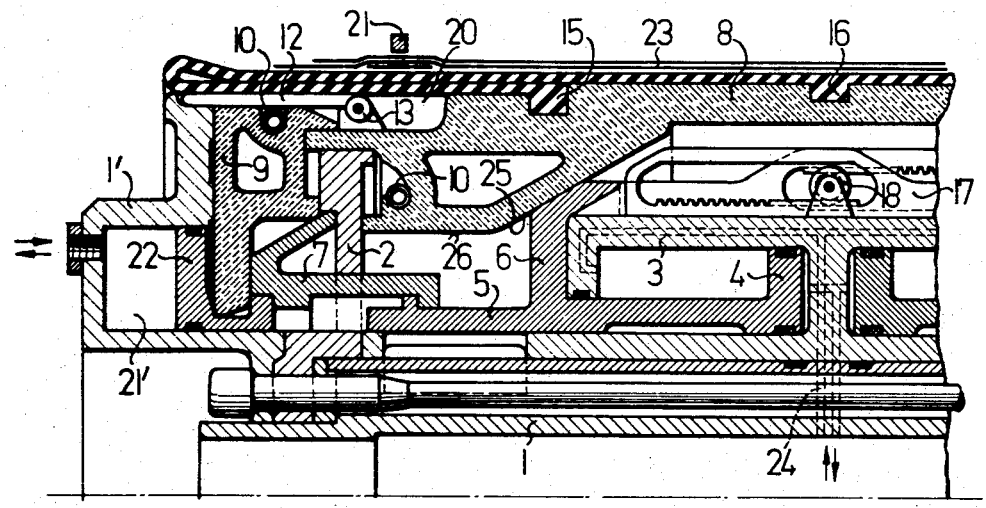
Figure 2:
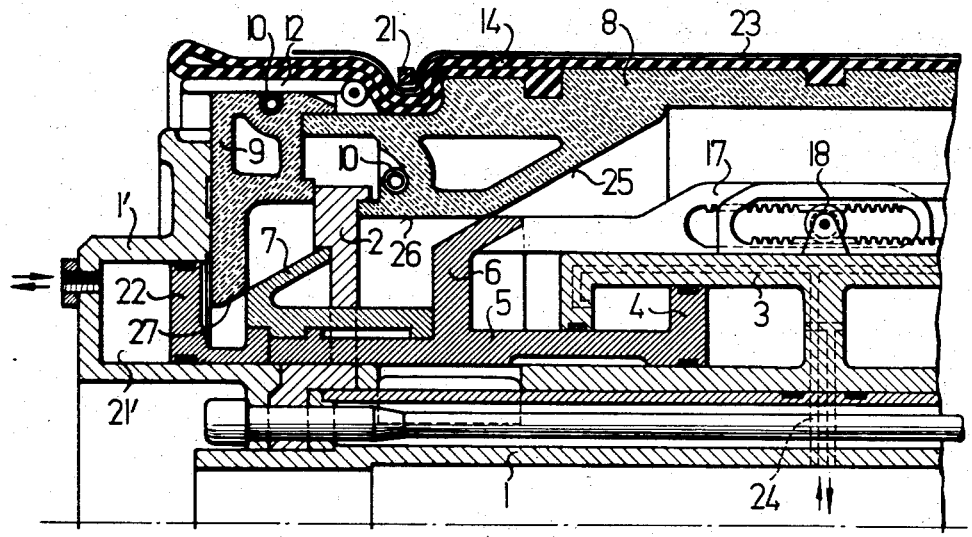

The present invention relates to tire building drums and, more specifically to segmental drums for building tire carcasses. The tire building drum to which the present invention relates represents a segmental drum which is variable in diameter and has associated therewith inflatable rolling bodies for folding the laterally protruding fabric marginal portions about the tire cores. The drum is furthermore equipped with actuating elements adapted to move into an inclined position for the rolling bodies cooperating with the drum.

With heretofore known tire building drums of the above-mentioned type which serve for the production of carcass blanks according to the flat band method, the actuating elements comprise auxiliary drums arranged on both sides of the drum at the end faces thereof. These auxiliary drums are formed by segments distributed over the circumference of the drum and are adapted to tilt so as to assume an inclined position in such a way that a rolling movement of the rolling bodies and thus a folding of the laterally outwardly located fabric margins about the bead cores will occur. Such an arrangement, however, is expensive, particularly because special bearing and control elements are necessary for the segments of the above-mentioned auxiliary drums.

It is, therefore, an object of the present invention to provide a tire building drum construction which will overcome the above-mentioned drawbacks.

It is another object of this invention to provide a simplified tire building drum which will make special means for the journalling and control of the above-mentioned elements entirely superfluous.

These and other objects and advantages of the invention will appear more clearly from the following specification in connection with the accompanying drawings, in which:

FIGS. 1 to 4 respectively illustrate partial sections through a segmental drum according to the invention for building tire carcasses, said figures respectively illustrating different phases of operation.

The segmental tire building drum according to the present invention is characterized primarily in that the actuating elements for the inflatable rolling bodies are formed by tiltable levers on the segments forming the drum. According to a further development of the present invention, the driving elements for the drum segments are also operable to actuate and tilt the said levers.

The provision of the levers and the means on the drum segments for tilting said levers bring about that these elements can be adjusted together with the drum segments. If, for instance, the drums are adjusted as to their maximum diameter, the above-mentioned levers and the means for tilting the same are likewise in a corresponding position. Moreover, the control of the lever tilting means by the actuating elements for the drum segments represents a considerable simplification. This is of particular importance inasmuch as a segmental drum requires a great number of parts movably journalled on the drum shaft which greatly impair or may make difficult the structural design of the drum body.

Referring now to the drawings in detail, the drum illustrated therein comprises a hollow drum shaft 1 which is equipped with fixedly arranged confining discs 2 and serves for journalling an annular double cylinder 3 with annular pistons 4. Pistons 4 each have tubular piston rods 5. Each piston rod 5 has fixedly connected thereto a conical disc 6 and has movably connected thereto a conical member 7. The drum is composed of drum segments 8 and auxiliary segments 9 which are radially adjustable by means of members 6 and 7. Segments 8 form a practically cylindrical drum outer surface. Segments 8 and 9 are respectively additionally subjected to the influence of annular helical springs 10 for returning segments 8 and 9 respectively. The end faces of the segmental drum are formed by disc-shaped members 1'. All segments 8, which are uniformly distributed over the circumference of the drum, have both ends provided with tilting levers 12 which are pivotally connected thereto by pivots 13 which extend substantially tangential to the circumferential surface of the drum.

Segments 8 and tilting levers 12 are surrounded by a bellows 14 of rubber or similar material. Bellows 14 is doubled at both ends of the drum and has its marginal portions fixedly connected to segments 8 at 15 and in the central portion at 16.

A synchronous movement of conical discs 6 during an axial movement of the piston rods 5 will be assured by racks 17 and a pinion 18 meshing therewith and mounted on cylinder 3.

Laterally of the pivots 13 for tilting levers 12 there is provided an annular recess 20 which will receive the tire cores 21 when the drum diameter is increased.

Each of the end discs 1' confines an annular cylindrical chamber 21' in which an annular piston 22 is axially displaceably arranged.

Operation of the drum

First the drum is adjusted to its smallest diameter as shown in FIG. 1 whereupon a tire fabric 23 is placed on the drum. Near the marginal portions of said fabric there are placed the tire cores 21. Thereupon a pressure fluid medium is introduced into bore 24 from where it passes into cylinder 3 so that pistons 4 will in opposite direction be moved outwardly. In view of the conical surfaces 25 (only the left-hand side conical surface 25 being shown) on segments 8 and due to the action of conical discs 6, the drum will expand radially outwardly. As a result thereof, segments 9 are moved outwardly by segments 8.

When conical discs 6 arrive in the axially parallel parts 26 of the inner surface of the respective adjacent segment 8, no further increase in the drum diameter will occur. When conical discs 6 move further outwardly in axial direction, they will act upon conical members 7 so that their respective conical surfaces 7' will engage the respective adjacent conical surface 27 of the adjacent segment 9. Simultaneously therewith, bellows 14 will be so acted upon that the laterally outwardly located pockets will be inflated by compressed air as shown in FIG. 3. A further movement of pistons 4 and conical members 7 causes segments 9 to move radially outwardly as shown in FIG. 4 whereby they will act upon the adjacent surface of tilting levers 12 and tilt the same upwardly as shown in FIG. 4. In this way, the inflated pocket of bellows 14 is engaged and is rolled over as likewise shown in FIG. 4. The laterally outwardly located marginal portions of fabric 23 are thus folded over the bead cores 21.

After this operation has been completed, pressure fluid is introduced through a connection 28 on each side of the drum into cylinder 21' whereupon the respective pistons 22 are moved inwardly. As a result thereof, the members 4, 6, 5 and 7 are returned to the position shown in FIGS. 2 or 3 while the segments 9 due to the influence of springs 10 are moved inwardly. The collapse of the drum is effected by a further movement of drum segments 8 radially inwardly by a return of piston 4 into its FIG. 1 position.

Of particular importance in connection with the present invention is the arrangement and journalling of tilting levers 12 on drum segments 8 and the actuation of said segments 8. As will furthermore be evident from the above, the present invention comprises a common centrally located drive in the form of pistons 4 for the segments which bring about the tilting of tilting levers 12. To this end, the surfaces 25 and 26 acted upon by conical discs 6 have a conical section and an axis-parallel section so that when the conical surfaces 25 are acted upon, an increase in the drum diameter will occur while when the conical discs 6 slide along the cylindrical surface 26, segments 9 can be actuated.

It is, of course, to be understood that the present invention is, by no means, limited to the particular construction shown in the drawings but also comprises any modifications within the scope of the appended claims.

What I claim is:

1. A tire building drum of variable diameter which includes: a plurality of radially movable segments, each of said segments having its inside provided with oppositely inclined surfaces tapering in radially outward direction, each of said segments also having axially spaced surfaces substantially parallel to the axis of said drum, inflatable means respectively extending around the end portions of said drum and foldable in inflated condition outwardly and in the direction toward each other, two groups of lever means respectively pivotally connected to the end portions of said segments adjacent said inflatable means and operable to impart a folding movement upon said inflatable means, a plurality of lever pivoting means respectively associated with and operable to pivot said lever means for causing the same to impart a folding movement on said inflatable means, and actuating means arranged within said segments and operable successively to move along said inclined surfaces for adjusting said segments radially outwardly and to move along said axis parallel surfaces for actuating said lever pivoting means.

2. A drum according to claim 1, which includes return means arranged within said drum and operable to return said actuating means to the ineffective position thereof to thereby permit said segments to move radially inwardly for reducing the drum diameter and also to permit movement of said lever pivoting and thereby of said lever means to their ineffective positions.

3. A drum according to claim 2, in which said return means includes fluid operable cylinder piston means within said drum.

4. A tire building drum of variable diameter, which includes: a plurality of radially movable segments, having inwardly facing first and second control surface means, inflatable means respectively extending around the end portions of said drum and foldable in inflated condition outwardly and in the direction toward each other, two groups of lever means respectively pivotally connected to the end portions of said segments and adjacent said inflatable means, a plurality of lever pivoting means movable radially within said drum and operable to pivot said lever means so as to cause said lever means to impart a folding movement upon said inflatable means, primary reciprocable means reciprocable in axial direction of said drum and movable from an ineffective position in axially outward direction while successively engaging said first surface means of said segments to move said segments radially outwardly and said second surface means to hold said segments in their radially outwardly moved positions, secondary reciprocable means arranged within said drum and likewise reciprocable in axial direction of said drum, said secondary reciprocable means being connected to said primary reciprocable means by a lost motion connection and being operable in response to said primary reciprocable means moving axially outwardly along said second control surface means to move from an ineffective position to an effective position to thereby move said lever pivoting means radially outwardly for pivoting said lever means, and means associated with said primary reciprocable means and operable to return the same and said secondary reciprocable means to their ineffective positions to thereby permit radial inward movement of said segments and said lever pivoting means.

5. A drum according to claim 4, in which said primary reciprocable means and said means associated therewith form double acting fluid operable piston means.

6. A drum according to claim 4, which includes spring means continuously urging said segments and said lever pivoting means radially inwardly.

References Cited

UNITED STATES PATENTS

| | | | |
|---|---|---|---|
| 2,558,684 | 6/1951 | Haase | 156—418 |
| 2,565,071 | 8/1951 | Frazier | 156—401 X |
| 2,653,645 | 9/1953 | Frazier | 156—419 X |
| 2,715,931 | 8/1955 | Frazier | 156—401 X |
| 3,044,533 | 7/1962 | Lowe | 156—401 |

HAROLD ANSHER, *Primary Examiner.*

U.S. Cl. X.R.

156—417